(12) United States Patent
Boodaghians et al.

(10) Patent No.: US 10,071,926 B2
(45) Date of Patent: Sep. 11, 2018

(54) SCALE PREVENTION FOR AIRCRAFT WATER SYSTEM

(71) Applicant: MAG AEROSPACE INDUSTRIES, LLC, Carson, CA (US)

(72) Inventors: Razmik B. Boodaghians, Glendale, CA (US); Kevin Huang, Los Angeles, CA (US); Christoph Goeschel, Seattle, WA (US); Christina Ortolan, Long Beach, CA (US); Vikram Chauhan, Redondo Beach, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 190 days.

(21) Appl. No.: 13/943,105

(22) Filed: Jul. 16, 2013

(65) Prior Publication Data

US 2014/0014567 A1   Jan. 16, 2014

Related U.S. Application Data

(60) Provisional application No. 61/671,911, filed on Jul. 16, 2012.

(51) Int. Cl.
*C02F 5/00* (2006.01)
*B64D 11/04* (2006.01)
(Continued)

(52) U.S. Cl.
CPC .............. *C02F 5/00* (2013.01); *B01D 24/266* (2013.01); *B01D 27/02* (2013.01); *B64D 11/02* (2013.01);
(Continued)

(58) Field of Classification Search
CPC  C02F 5/00; C02F 2201/006; C02F 2201/001; C02F 2307/14; C02F 9/005; C02F 1/285; C02F 1/001–1/004; C02F 5/10; C02F 3/087; C02F 2201/003; B01D 24/266; B01D 24/26; B01D 24/20; B01D 24/02; B01D 35/147; B01D 35/14; B01D 35/02; B01D 24/28–24/407; B01D 27/02; B01D 27/08; B01D 24/32; B01D 24/36; B01D 24/167; B01D 24/186; B01D 24/24;
(Continued)

(56) References Cited

U.S. PATENT DOCUMENTS 3,191,868 A    6/1965  Brown et al.
3,780,867 A *  12/1973 Zirlis ........................... 210/266
(Continued)

FOREIGN PATENT DOCUMENTS

GB          833327 A  *  4/1960  ............ B01D 24/16

OTHER PUBLICATIONS

Definition of resin, Merriam-Webster dictionary No Date.*
(Continued)

*Primary Examiner* — David C Mellon
*Assistant Examiner* — Liam A Royce
(74) *Attorney, Agent, or Firm* — Kilpatrick Townsend & Stockton LLP; Dean W. Russell; Kristin M. Crall

(57) ABSTRACT

Embodiments of the present invention relate generally to systems and methods for preventing mineral scale deposits in an aircraft water system, and more specifically, within devices and water transport systems, such as coffeemakers and other galley equipment, as well as the water lines themselves.

11 Claims, 10 Drawing Sheets

(51) Int. Cl.
- *B01D 24/26* (2006.01)
- *B01D 24/36* (2006.01)
- *B01D 11/04* (2006.01)
- *B01D 27/02* (2006.01)
- *B64D 11/02* (2006.01)

(52) U.S. Cl.
CPC .............. *B64D 11/04* (2013.01); *B01D 24/36* (2013.01); *C02F 2201/001* (2013.01); *C02F 2201/006* (2013.01); *C02F 2307/14* (2013.01)

(58) Field of Classification Search
CPC .... B01D 24/40; B01D 24/4684; B01D 23/20; B01D 23/205; B01D 2024/125; B01D 2024/145; B01D 2024/162; B64D 11/02; B64D 11/04
USPC ......................................................... 210/241
See application file for complete search history.

(56) References Cited

U.S. PATENT DOCUMENTS

| | | | | |
|---|---|---|---|---|
| 3,817,381 A | * | 6/1974 | Heskett et al. | 210/140 |
| 4,246,119 A | * | 1/1981 | Alldredge | B01D 24/008 210/279 |
| 4,420,403 A | * | 12/1983 | Tufts | B01D 24/165 210/289 |
| 4,547,286 A | * | 10/1985 | Hsiung | B01D 24/002 210/274 |
| 4,786,420 A | * | 11/1988 | Dalessandro | B01D 29/114 210/252 |
| 4,826,609 A | * | 5/1989 | Hensley | B01D 23/10 210/503 |
| 5,429,740 A | * | 7/1995 | Van Der Herberg | C02F 3/06 210/151 |
| 5,770,080 A | * | 6/1998 | Malone | C02F 3/06 210/151 |
| 6,099,735 A | | 8/2000 | Kelada | |
| 6,132,611 A | * | 10/2000 | Yuen | B01D 24/008 210/266 |
| 6,287,462 B1 | | 9/2001 | Likos | |
| 2003/0183587 A1 | * | 10/2003 | Hawkins | 210/787 |
| 2009/0057241 A1 | * | 3/2009 | Nauta | 210/767 |
| 2010/0051519 A1 | | 3/2010 | Maier-Witt et al. | |
| 2010/0243581 A1 | | 9/2010 | Williams et al. | |
| 2011/0192782 A1 | | 8/2011 | Tubby et al. | |

OTHER PUBLICATIONS

International Patent Application No. PCT/US2013/050639, International Preliminary Report on Patentability dated Jan. 29, 2015.
International Search Report and Written Opinion dated Nov. 14, 2013 in Application No. PCT/US2013/050639.
Europe Patent Application No. 13742564.1, Communication Pursuant to Article 94(3) EPC dated Jan. 3, 2017.
Europe Patent Application No. 13742564.1, Communication Under Rule 71(3) EPC (Intention to Grant) dated Jan. 23, 2018.

\* cited by examiner

SCALE PREVENTION FOR AIRCRAFT WATER SYSTEM

CROSS REFERENCE TO RELATED APPLICATIONS

This application claims the benefit of U.S. Provisional Application Ser. No. 61/671,911, filed Jul. 16, 2013, titled "Scale Prevention for Aircraft Water System," the entire contents of which are hereby incorporated by reference.

FIELD OF THE INVENTION

Embodiments of the present invention relate generally to systems and methods for preventing mineral scale deposits in an aircraft water system, and more specifically, within devices and water transport systems, such as coffeemakers and other galley equipment, as well as the water lines themselves.

BACKGROUND

Potable water to be loaded onto aircraft contains various minerals, including calcium and magnesium, and some regions have especially hard water with high mineral levels. These minerals have the potential to combine with carbonate ions in water to form hard scale on surfaces in contact with the water. Scale particles' solubility decreases with increasing temperature, causing it to precipitate at elevated temperatures, especially onto heating elements. Frequently used heating elements, such those used in coffeemakers, experience the most damage from scale. Layers of scale create resistance to heat transfer, placing excessive load on heating components and elevating energy usage. Device lifetime is shortened due to severely reduced performance or failure. In addition to causing physical damage, scale is also conducive to bacteria growth, which creates a health hazard.

Coffeemakers, water heaters, steam ovens, and other devices receive frequent usage on commercial airline flights and therefore accumulate scale rapidly, limiting their useful lifetime. The financial resources and time spent on repairs and replacements are costly for airlines. It is therefore beneficial to eliminate this problem by preventing scale from depositing on any device or pipe surfaces.

Scale prevention devices are used for residential and commercial uses, for example, in homes, restaurants, and any other locations where there are scale problems associated with hard water. Embodiments of the invention will be described throughout the remainder of this document for use in connection with aircraft, but it should be understood that uses in other locations and for other purposes are possible as well. Although the embodiments described are particularly designed to be lightweight, small, and efficient as required for a passenger transport vehicle, it is envisioned that uses in other environments are possible.

Airlines have great need for products with high reliability, low acquisition and maintenance costs, minimized weight and size, and demonstrated functionality. The scale prevention devices described herein are intended to meet all of these needs within its compact design, as well as improve these attributes for other devices, such as coffeemakers and other heating elements. Simply reconfiguring a currently-available scale prevention device or plumbing it in-line with an aircraft water line system is not a feasible way to prevent scale on an aircraft or other transportation vehicle due to the nature of the water lines associated with vehicles and various space, weight, and other aircraft requirements. The system should be compact, it should have an inlet and an outlet so that it can be plumbed in-line with a water line, it should have enhanced drainage, it should work under various orientations, and should also be easy to disassemble for service.

BRIEF SUMMARY

Embodiments of the invention described herein thus provide a granular fluidization cartridge useful in an aircraft plumbing system. The system provides improved flow through the media bed, improved drainage features, a stand-alone cartridge, and other advantages that allow the devices to be used on-board aircraft and other passenger transport vehicles.

DETAILED DESCRIPTION

Figure 12:
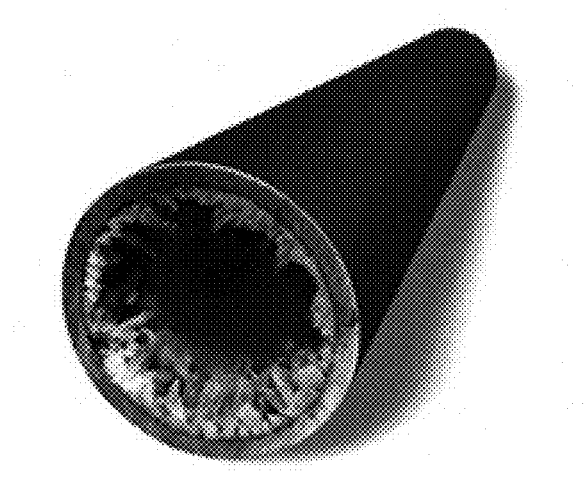
FIG. 12 illustrates a water line pipe with scale deposits formed therein.

Embodiments of the present invention provide a scale prevention device for use on board passenger transport vehicles, such as aircraft, that treats water to minimize the amount of scale deposited on surfaces within the water system after water treatment. Embodiments may also be designed to gradually remove scale deposits already in place. The technology for scale prevention is generally a salt-free method that uses a polymer-based media to control the type and/or size of calcium carbonate crystals that are formed, so that the crystals will not deposit onto heating elements and pipes. The granular media prevents minerals from depositing on the inside of water pipes, which can cause damage and slow the flow of water therein. One example of a water pipe that has been blocked with scale is shown in FIG. 12. Potential examples of such granular/filter media are manufactured and sold by companies such as Watts Water Technologies and Watch Water Technology, among others. However, water scale prevention systems designed for land-based use, for example in residential and business environments, do not need to meet aerospace standards and are designed such that they are not feasible for use on-board an aircraft, due to either weight considerations, drainage requirements, and so forth.

Accordingly, the present inventors have designed a way to provide a water scale prevention device 10 for use on-board a passenger transport vehicle. In one embodiment, the media used is held in a cartridge 12 that fits within a housing 14.

Figure 4:
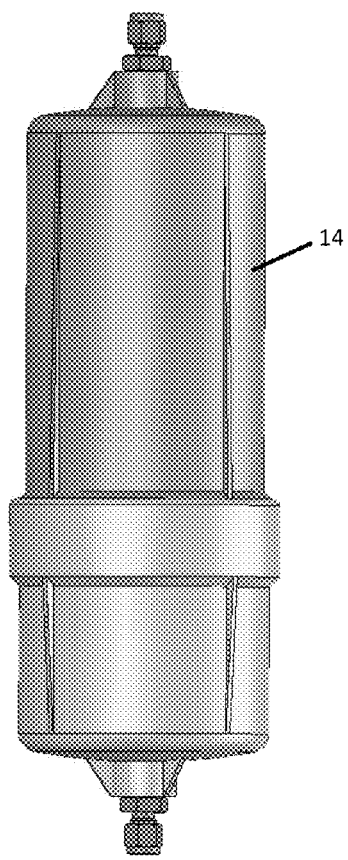
FIG. 4 shows one example of a potential housing.
Figure 7:
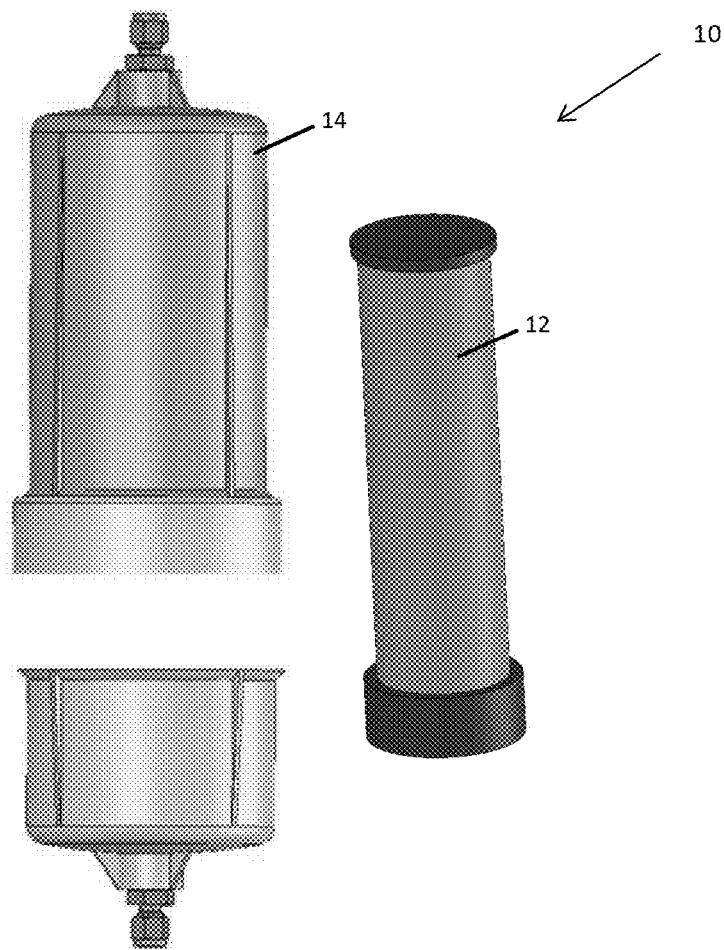
FIG. 7 shows one embodiment of a permanent housing with replaceable cartridge insert.

The cartridge 12 may be replaceable, and the housing 14 may be a permanently positioned housing. One example of a potential housing is shown in FIG. 4. An alternate embodiment of a housing that uses a replaceable cartridge 12 is shown in FIG. 7. Modifications to conventional water media housings may include using appropriate water connections and airworthy materials, and designing for the spatial envelope in which the cartridge will be installed.

Figure 5:
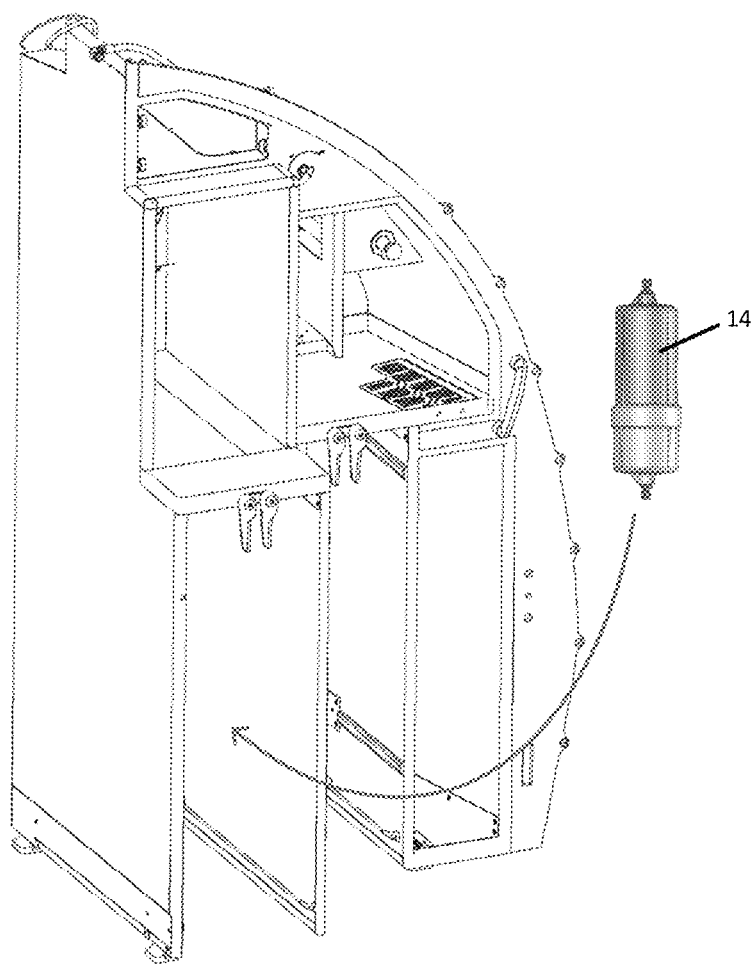
FIG. 5 shows one example of a potential location for a device to be positioned in an aircraft galley.
Figure 6:
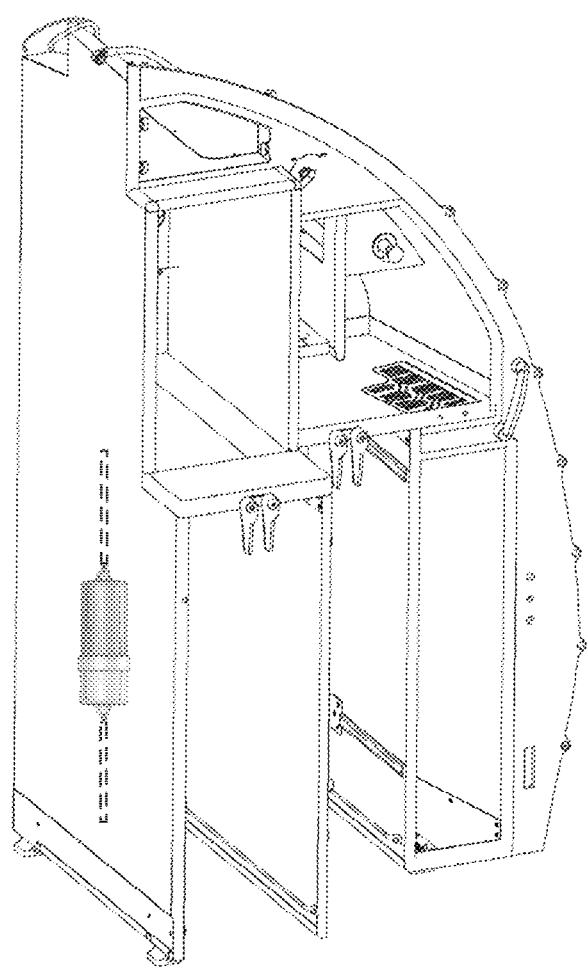
FIG. 6 shows the device of FIG. 5 in position.

The housing 14 is generally located in-line with the water system and may be installed immediately upstream of targeted areas, e.g. coffeemaker, as shown in FIGS. 5 and 6. Bypass plumbing options are described below; it is relevant to note here that the first installation may need to interrupt water, but periodic replacements generally will not. Alternatively, the housing 14 may be installed at the water system point of entry.

This system provides a lightweight, cost-effective design that allows materials to be used in an economic disposable cartridge. This style would utilize an interface that allows water to continue to flow through the lines even when the filter has been removed, in case of the need for a water system disinfection procedure or to facilitate faster drainage.

Figure 8:
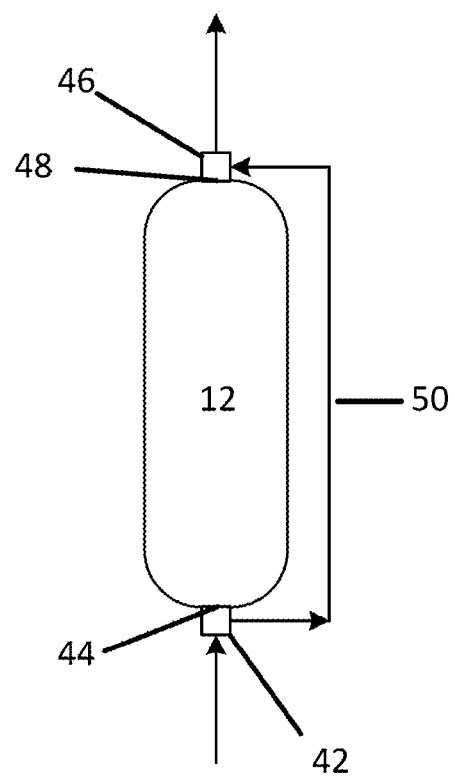
FIG. 8 shows a schematic of a potential water system.

In one embodiment, as shown in FIG. 8, there may be an upstream diverter valve 42 located at the housing water inlet 44 and a downstream diverter valve 46 at the housing water outlet 48. The two valves 42, 46 can be manually operated valves, such that when the valves are oriented in line with the cartridge 12, water flows only through the cartridge and not through the bypass line 50. With the valves in this position, the cartridge 12 is locked in place and is not able to be removed. When the valves are turned to their alternate or diverting position, water will then flow through the bypass line 50 and the cartridge 12 will be released and can be replaced. Alternatively, the valves may be automatic in such a way that the position of the cartridge will control the orientation of the valves. When the cartridge is in place and rotated to lock the inlet 44 and outlet 48 connections, the valves 42, 46 will open to allow water flow into the cartridge 12. When the cartridge 12 is rotated to unlock from its position, the valves will allow water to flow only through the bypass line 50.

In all embodiments, no power or chemicals are needed for operation. The device is designed to be generally maintenance-free for the lifetime of the media. The quantity of the media and therefore the size of housing to be used are determined by the location in which the system is to be installed, as well as the hardness and flow rate of the entering water.

The device 10 may be cylindrical or any other appropriate cross section. The device may be installed as a single replaceable part, complete with media and shell structure as one piece. An alternative design would involve a permanent housing 14 or shell, while the media is contained in a separate cartridge 12. This cartridge 12, inserted in the permanent housing, would be the replacement part in this configuration. Water ports allow water to enter and exit the cartridge. For example, there is provided an inlet 44 and an outlet 48 to the cartridge. Although shown at the top and bottom of the cartridge, these ports/inlets/outlets may be located anywhere along the cartridge, such as along the side or elsewhere.

A drainage system is also provided. The drainage system is generally provided by the combination of various drainage features. Examples of potential drainage systems include but are not limited to sloped interior contours, and screen/mesh to allow water to flow through but retain filter media. The drainage systems generally use gravity to drain the device 10. A drainage feature is particularly important for a scale prevention device 10 to be used in connection with aircraft because water should be drained from the scale prevention device 10 at the end of every use. Water remaining in any water lines or water systems in the aircraft can freeze, creating water line bursts, and stagnant water can foster bacteria growth and create health problems. Accordingly, the system provides alternate drainage options.

Figures 1, 2, 3A:
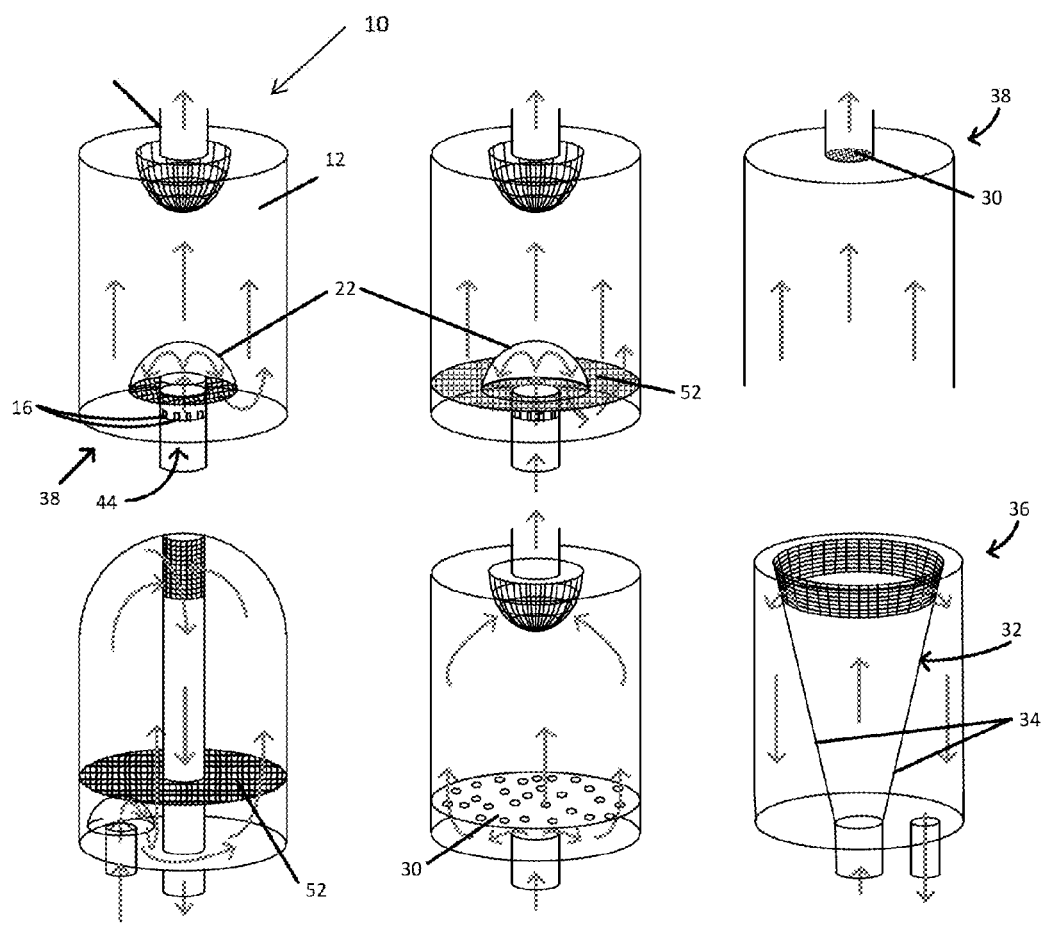
FIG. 1 shows a side perspective view of one embodiment of a scale prevention system.
FIG. 2 shows a side perspective view of another embodiment of a scale prevention system.
FIG. 3A shows a side perspective view of an alternate embodiment of a scale prevention system.
Figure 3B:
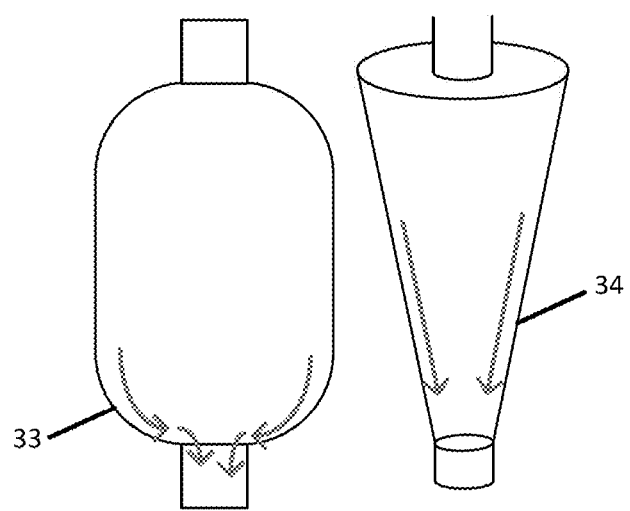
FIG. 3B shows contoured or angled walls for water drainage.

As shown in FIGS. 3A and 3B, it is possible to provide an angled and sloped container 32 geometry to avoid stagnant areas. Such angled or sloped walls 34 may be provided in any of the embodiments shown in FIGS. 1-3A, if desired. By providing angled cartridge walls 34 in the cartridge area, water can better flow by gravity away from the filtering area 36, as shown by the arrows in FIG. 3A. Curved walls 33 are an alternate drainage option, as shown in FIG. 3B. It is also possible to provide one or more media barriers 38, such as slots 16 or screens 30, and/or other orifices that allow water passage down through cartridge 12, but that do not allow passage of any filter media. For example, a mesh screen 52 at the lowest point in the cartridge interior may be provided in order to allow water to drain back through the system, avoiding any accumulation of water at these low points. A combination of these options may also be used if desired.

Such media barriers 38 create a negligible interruption to the flow path during normal operation. The mesh screens that aid in water drainage out of the cartridge after use, described above, also retain media within the cartridge. The size of these screens is designed based on media type used within the filter.

Regarding improved flow and performance, the fluidized bed may span the substantial interior of cartridge, which results in uniform aging of the media. Encouraging full fluidization of the media bed and usage of the entire cartridge volume can help extend the life of the device. For example, in one embodiment, as shown in FIGS. 1 and 2, a domed umbrella feature 22 redirects fluid flow, especially in the case of incoming flow at the bottom of the cartridge. This facilitates water passage through all of the media rather than forcing a path through a small percentage of media.

Figure 9:
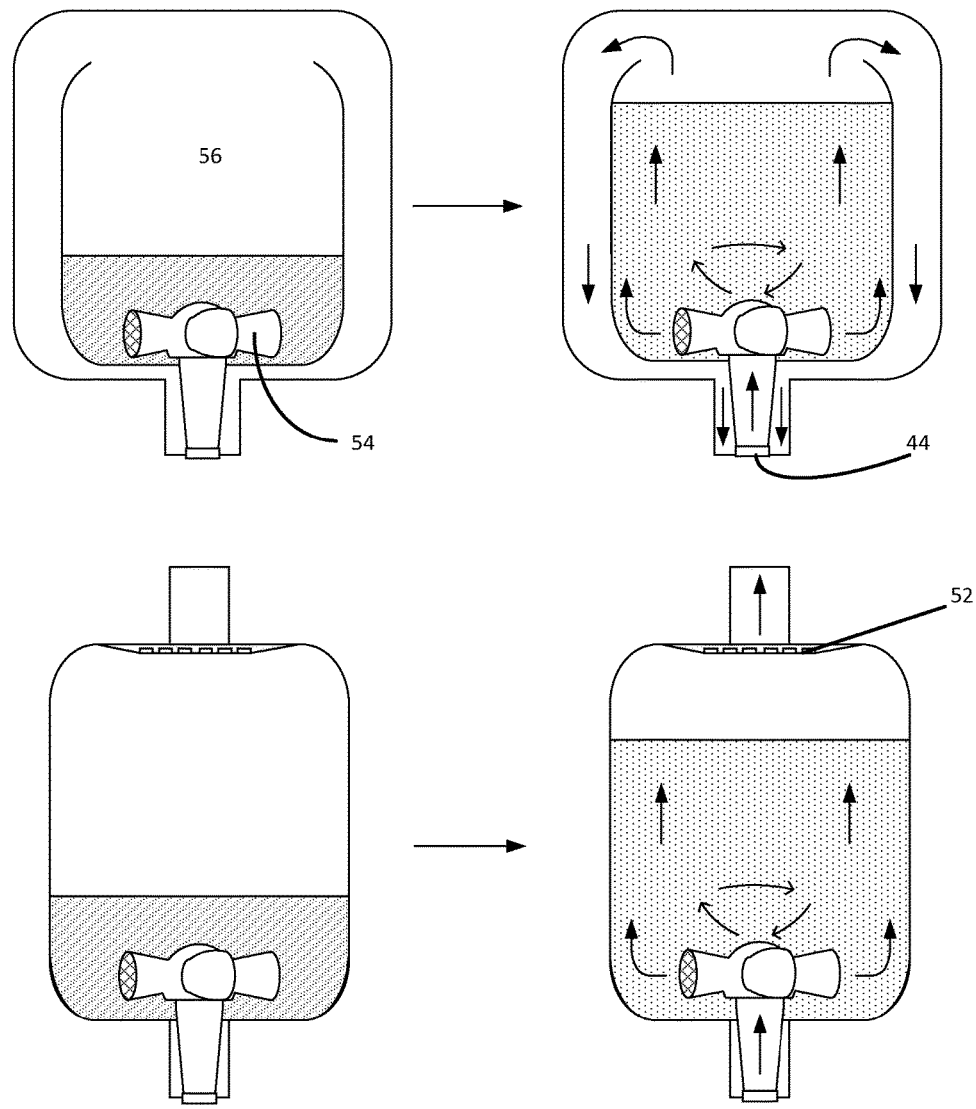
FIG. 9 shows spinning nozzle embodiments.

In another embodiment of the invention, the incoming flow of water is directed through a freely spinning nozzle 54 protruding into the media cavity 56, as shown in FIG. 9. In the resting state, the nozzle 54 sits motionless within the unexpanded media bed. A flow of liquid, having been introduced into the inlet 44, flows through the nozzle 54 to propel the armatures forward via Newton's third law. The nozzle 54 spins clockwise or counterclockwise about the vertical axis of the cartridge 12. Momentum of the liquid quickly expands the media bed into the media cavity 56 by imparting kinetic energy and a liquid matrix into which the media can expand. Internal geometry of the cartridge is designed to direct the fluid's axial momentum upward against gravity to support the expansion of the media bed. The spinning action of the nozzle further imparts kinetic energy and turbulence to the expanded media bed in order to increase liquid contact time with media. It is also possible to use a porous panel or mesh screen 52 to divert flow laterally before allowing upflow and fluidization of media for treatment of the water.

The umbrella feature or the rotating nozzle feature generally provide a system to provide uniform fluidization system of the water that flows through the cartridge. These features are provided in order to control the direction of the incoming flow of water to guide the flow path to cover the full cartridge cross-section. In doing this, the entirety of the media bed is contacted and fluidized, creating a well-mixed reaction chamber. These unique features of the cartridge design ensure that the media bed is completely and evenly fluidized. Because the full amount of media is in contact with the water during treatment, additional head space is not necessary to achieve the desired contact time. This results in a more compact design package, a critical feature due to the limited space and weight allowances on aircraft and other passenger transport vehicles.

Figure 10:
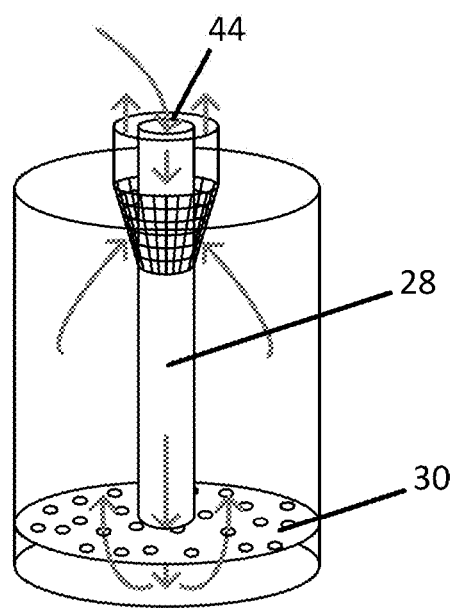
FIG. 10 shows a water inlet located at a top of a cartridge.

As shown in FIG. 10, if a water inlet 44 is provided at the top of the cartridge 12, a tube 28 may be provided that directs flow to bottom of the cartridge 12 and forces turn-around to allow upflow of water through the media. Additionally or alternatively, spherical and/or flat screens or porous panels 30 may be used to distribute water flow and to hold media within the cartridge 12. The choice as to which water flow design to use is generally based upon space available within cartridge, pressure drop restrictions, and any other water flow considerations to be addressed by the design.

Figure 11:
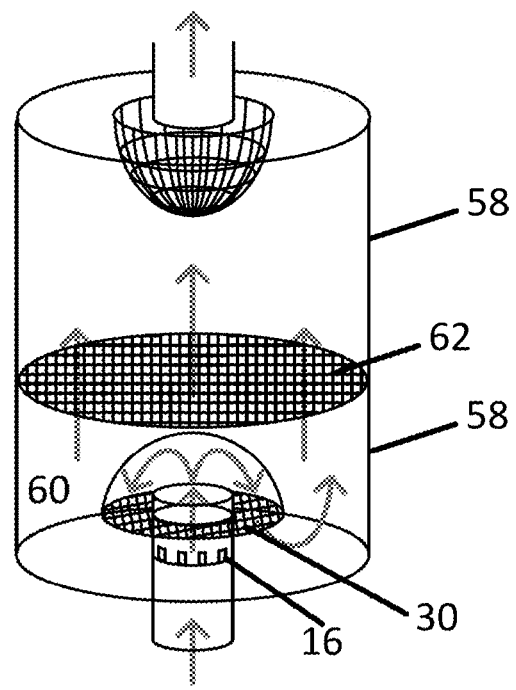
FIG. 11 shows how multiple chambers may be used.

It is also possible to use multiple chambers to house multiple media types, separated by an additional screen or panel (e.g. granular activated carbon and scale prevention media), as shown in FIG. 11. Multiple chambers 58 for multiple media types may be provided. For example, a screen 30 and/or slots 16 may be provided at the bottom chamber 60 of the unit for drainage and holding media in, and a large screen 62 may separate the two different chambers.

Changes and modifications, additions and deletions may be made to the structures and methods recited above and shown in the drawings without departing from the scope or spirit of the invention and the following claims.

What is claimed is:

1. A scale prevention device configured for use on board a passenger transport vehicle, the scale prevention device comprising:
   (a) a cartridge comprising:
      an inlet configured to cooperate in-line with a water system,
      an outlet,
      internal inwardly angled side walls that extend along a length of the cartridge and that are separate from external cartridge walls, the internal inwardly angled side walls creating a funnel shape from a wide portion to a narrow portion, and
      a media cavity for liquid treatment, the media cavity having a scale prevention treatment media, and
   (b) a system to provide uniform fluidization of the scale prevention treatment media by fluid passing through the cartridge such that liquid entering through the inlet contacts the system to provide uniform fluidization and expands the scale prevention treatment media into the media cavity, the inlet directly connected to a domed umbrella feature comprising a dome and edges, wherein a concave face of the dome receives and redirects an incoming fluid flow path traveling in a first direction from the inlet by turning the incoming fluid flow in an opposite direction and forcing the fluid to flow out from under the edges of the domed umbrella feature, which diverts the incoming fluid flow path across substantially all of the scale prevention treatment media.

2. The scale prevention device of claim 1, wherein the scale prevention device comprises a housing for enclosing the cartridge.

3. The scale prevention device of claim 1, further comprising a by-pass system.

4. The scale prevention device of claim 1, wherein the cartridge has a base portion and a top portion, wherein the inlet is located at the base portion of the cartridge and the outlet is located at the top portion of the cartridge.

5. The scale prevention device of claim 1, wherein the device comprises more than one cartridge to provide a multi-chamber device.

6. The scale prevention device of claim 1, further comprising a drainage system.

7. The scale prevention device of claim 1, wherein the device is installed in line with water system lines of the passenger transport vehicle.

8. The scale prevention device of claim 1, wherein the media cavity is defined by the internal inwardly angled side walls, wherein the cartridge defines an outer wall, wherein a space is formed between the the internal inwardly angled side walls and the outer wall for treated fluid overflow, such that the treated fluid can be routed to the outlet via the space.

9. The scale prevention device of claim 1, wherein the cartridge has a base portion and a top portion, wherein the inlet is located at the base portion of the cartridge and the outlet is located at the base portion of the cartridge.

10. The scale prevention device of claim 1, wherein the scale prevention treatment media comprises a polymer-based media configured to reduce precipitation of scale-forming crystals.

11. A scale prevention device configured for use on board a passenger transport vehicle, the scale prevention device comprising:
   (a) a cartridge comprising:
      an inlet configured to cooperate in-line with a water system,
      an outlet,
      internal inwardly angled side walls that extend along a length of the cartridge and that are separate from external cartridge walls, the internal inwardly angled side walls creating a funnel shape from a wide portion to a narrow portion, and
      a media cavity for liquid treatment, the media cavity having a scale prevention treatment media, and
   (b) a system directly connected to the inlet that changes direction of an incoming fluid flow after delivery through the inlet such that the incoming fluid flow is forced in a reversed direction and then outward and distributed more widely across the fluid treatment media bed and expands the media bed into the media cavity.

* * * * *